United States Patent [19]
Knapp et al.

[11] Patent Number: 4,966,789
[45] Date of Patent: Oct. 30, 1990

[54] PROCESS OF MANUFACTURING SEAL MEMBERS HAVING A LOW FRICTION COEFFICIENT

[75] Inventors: Alfons Knapp, Biberach an der Riss; Gunter Buzzi, Schiltach, both of Fed. Rep. of Germany

[73] Assignee: Masco Corporation of Indiana, Indianapolis, Ind.

[21] Appl. No.: 202,176

[22] Filed: Jun. 3, 1988

Related U.S. Application Data

[62] Division of Ser. No. 919,266, Sep. 22, 1986, abandoned.

[30] Foreign Application Priority Data

Feb. 17, 1985 [IT] Italy ................. 67138 A/85

[51] Int. Cl.⁵ ............... C23C 16/00; C23C 16/26
[52] U.S. Cl. ............... 427/248.1; 427/249; 427/255; 427/255.2
[58] Field of Search ........ 427/248.1, 249, 255, 427/255.2, 255.6; 428/698, 212, 408, 446, 457; 251/36; 137/625.17, 625.4

[56] References Cited

U.S. PATENT DOCUMENTS

| | | | |
|---|---|---|---|
| 3,661,180 | 5/1972 | Lyon | 137/625.17 |
| 3,900,592 | 8/1975 | Kennedy et al. | 427/249 |
| 3,900,612 | 8/1975 | Okamoto | 427/249 |
| 3,975,165 | 8/1976 | Elbert et al. | 428/446 |
| 4,088,153 | 5/1978 | Paasikivi | 137/625.17 |
| 4,169,637 | 10/1979 | Voitas | 428/698 |
| 4,183,377 | 1/1980 | Bernat | 137/625.17 |
| 4,239,819 | 12/1980 | Holzl | 427/255.2 |
| 4,260,658 | 4/1981 | Erickson | 428/698 |
| 4,288,495 | 9/1981 | Terner | 428/446 |
| 4,420,142 | 12/1983 | Dworak et al. | 137/625.41 |
| 4,453,567 | 6/1984 | MacDonald | 137/625.17 |
| 4,540,596 | 9/1985 | Nimmagadda | 427/248.1 |
| 4,552,176 | 11/1985 | Herring | 251/368 |
| 4,621,659 | 11/1986 | Pawelzik | 137/625.17 |
| 4,733,694 | 3/1988 | Knapp | 137/625.17 |
| 4,738,281 | 4/1988 | Limet et al. | 137/625.17 |

FOREIGN PATENT DOCUMENTS

| | | | |
|---|---|---|---|
| 0045893 | 2/1982 | European Pat. Off. | 156/307.7 |
| 57-57868 | 4/1982 | Japan | 427/249 |
| 670249 | 4/1952 | United Kingdom | 137/625.17 |

Primary Examiner—Sadie Childs
Attorney, Agent, or Firm—Edgar A. Zarins; Steven L. Permut; Malcolm L. Sutherland

[57] ABSTRACT

A process for manufacturing a pair of seal members (10 and 12) such as a pair of disks which control the fluid flow of a faucet. The two seals are formed of a moderately hard material (14), such as stellite, ceramic materials, metal materials or synthetic materials, which can be precisely ground to a particular finish. At least one of the seal members (10) is coated with a thin layer (16) of very hard material such as silicon carbides, metal carbides, metal nitrides, or cubic crystallographic lattice carbons. The coating layer is applied through either physical or chemical vapor deposition. This process provides seal disks with low friction coefficients thereby eliminating the need to provide a lubricant between the cooperating surfaces of the disks. In addition, adhesion between the seals is eliminated despite the smooth surface finish of the disks. Thus, the disks formed through the process improve operation of the faucet or valve utilizing cooperating seal disks.

9 Claims, 1 Drawing Sheet

PROCESS OF MANUFACTURING SEAL MEMBERS HAVING A LOW FRICTION COEFFICIENT

This is a divisional of co-pending application Ser. No. 919,266 filed on Sept. 22, 1986 now continuing application Ser. No. 204,964 filed on June 6, 1988.

BACKGROUND OF THE INVENTION

I. Field of the Invention

The present invention relates to a process for manufacturing seal members from a hard material wherein the sealing effect is due to the precise finish of the sealing members and not by the interposition of any seals of pliable material. These seal members may be utilized in faucets, industrial valves, and injection pumps for diesel engines.

II. Description of the Prior Art

Sealing disks manufactured from hard materials and utilized as fluid flow regulation and interruption devices in faucets and the like, are conventionally produced with oxides or sintered aluminum silicates ground to a roughness of about 0.2 to 0.4 microns. Because of these precise finishes, these disks cooperate to form seals suitable to regulate and interrupt fluid flow through the system. Moreover, due to the strength of the materials utilized, normally 23,000 N/mm$^2$, these past known seal disks have an improved effective life and can resist foreign bodies, such as grains of sand, which may damage previous seal members. However, because of the precise finish of the working surfaces between the seal disks, these disks tend to adhere to one another which, without any lubricant, increases the friction between the disks. The normal coefficient of these past materials is in the nature of 0.12.

In order to provide efficient rotation of these seal disks in relation to each other and proper operation of the faucet, a thin layer of a silicon lubricant is provided between the disks. However, with time and repeated use of the faucet which causes the disks to rotate against each other, the silicon lubricant is gradually dispersed so that the friction between the disks increases to unacceptable levels. Eventually, the faucet will cease to operate.

Attempts have been made to produce these seal disks using wolfram carbide. However, manufacturing costs for this type of disk have proved to be prohibitive.

Further attempts have been made to produce the disks for faucets with a material composed of silicium carbide (SiC). The silicium carbide provides, in its known different crystallographic modifications, hardnesses between 28,000 N/mm$^2$ and 35,000 N/mm$^2$, which are much higher than the hardnesses of the materials presently used for this purpose, while providing frictional coefficients approaching 0.05. Moreover, this material has a reduced tendency for adhesion found in other smoothly finished surfaces thereby reducing the friction between the cooperating disks of the faucet. Despite these improvements in operation, the friction between the two disks made from silicium carbide has a tendency to increase beyond acceptable levels through extended usage.

Finally, the Applicant herein has constructed seal disks for faucets wherein the cooperating pair of disks have different frictional characteristics with at least one disk formed of silicium carbide. Although this process has provided a lasting reduction in the friction between the seal disks without the addition of a lubricant, the production and grinding of the disks formed from SiC require special plants and technologies. Thus, it was necessary to develop a process for manufacturing which could be widely and conveniently utilized yet would not be cost prohibitive.

BRIEF DESCRIPTION OF THE DRAWING

The present invention will be more fully understood by reference to the following description of the present invention when read in conjunction with the accompanying drawing, in which the reference characters refer to like parts throughout the views, and in which.

DESCRIPTION OF THE PRESENT INVENTION

Figure 1:
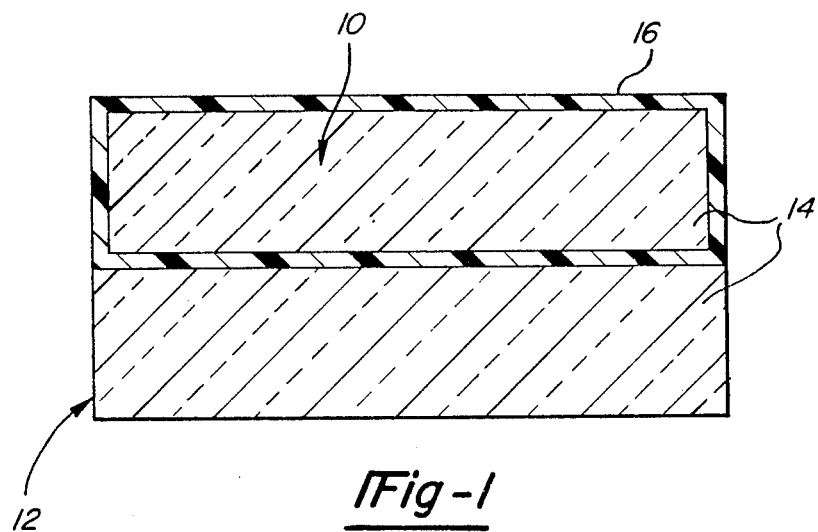
FIG. 1 is a cross-sectional perspective of the seal members of the present invention.

An object of this invention is to produce seal members of a sufficiently hard material that are capable of attaining a friction coefficient low enough to permit proper operation of the faucet or the like while limiting manufacturing costs of the seal disks.

According to the present invention, efficient seal members can be produced by forming the seal members from a rigid material capable of being precisely ground and coating at least one of the pair of seal members with a thin layer of substantially harder material. This coating is applied through physical or chemical vapor deposition to form cooperating surfaces between the disks which have different coefficients of friction. Among the coating materials which may be utilized, silicium carbides, metal carbides, metal nitrides (particularly the transition metals), and cubic crystallographic lattice carbons are preferred.

According to an aspect of this invention, at least one of the seal disks is coating with the coating material utilizing physical or chemical vapor deposition.

While applying the process of the present invention, both seal members must be able to receive a precise finish such as one obtained by an accurate grinding so as to permit the seal members to effectively work. Unlike conventional seal disks, the seal members formed by the process of the present invention do not require excessive hardness to resist extensive usage. In fact, in the seal members produced through the deposition of very hard materials, the materials forming the seal member only provide a support for the coating, while the sealing cooperation between the seal members is produced by the substantially harder coating material applied to at least one of the seal members. Thus, the seal members to the present invention can be formed from materials which, despite being hard and resistant enough to receive an appropriate finish and resist deformation, are not acceptable to form seal members by themselves without the addition of the coating.

Among the materials which may be suitable for forming the seal members are included stealites, ceramic materials of modest quality, metals and some synthetic materials characterized by high hardness, stiffness and stability. However, an uncoated seal member cooperating with a seal member coated with the substantially harder material and having a smooth finish does not get damaged despite its limited hardness. In fact, the difference in the hardness between the two cooperating surfaces of the paired seal members turns out to be of great advantage to reduce the friction coefficient without the addition of a lubricant. For this reason, it is unnecessary to coat the second seal member.

Alternatively, both seal members can be covered with the coating material but in this case the two cooperating surfaces must have sufficiently different characteristics to provide adequate movement between the surfaces. This can be accomplished by either covering the two seal members with two different coating materials or applying the coating materials over surfaces having different degrees of finish or a combination of these two.

An important advantage of providing layers of hard materials, applied through a physical or chemical vapor process, relates to the above-mentioned layers that do not change the finish of the surfaces of the seal members. Therefore, the disk which is to receive the deposition of very hard material can be worked for example by grinding or cutting before carrying out the deposition and afterwards working on a material hard enough to withstand the finishing process. On the other hand, this material is not so hard as to make this operation difficult and expensive or to require special devices and technology in producing the seal disks. This factor reduces production costs so that conventional machinery can be utilized in producing the seals.

Utilizing pairs of cooperating seal members, one of them having a greater degree of hardness than the other because of its covering and smooth surface, allows the use of a material having a reduced hardness for the other seal member. The other seal member may have a rougher finish and may include microscopic holes which reduce the support surface between the seal members. Due to this peculiarity, the friction between the two seal members is further reduced. In addition, the production costs are reduced not only because the manufacture of the uncovered seal member is cheaper but the finishing required is reduced as well An advantage of the seal members covered with a layer of silicium carbide is the chemical stability of this compound. It is not subject to corrosion or deformation in any kind of water and provides exceptional resistance to oxidation. Moreover, a similar property also characterizes other materials of high hardness which can be deposited by vapor and particularly by carbon having a cubic crystallographic structure. This material, which could not be utilized to form the body of the seal member, is very advantageous because of its reduced friction coefficient which approaches 0.02.

Of course, the process of this invention can be applied independently of the shape and the size of the seal members utilized in the appliance. Such seal members can be flat or can form bodies whose working surfaces are convex or concave. The application of this invention maintains the sliding movements of the appliances which utilize such members for longer periods of time. However, this process does not increase the cost of producing the seal members as the cost of the vapor deposition process is counterbalanced by the lower cost of the materials forming the seal members and the lower cost of working the members.

This invention is particularly useful in producing seal disks for valves and faucets, either to those having a pair of disks or those having three disks or only a disk cooperating with coupling-like disks placed at the inlets for the water. In addition, this process can be applied either to the faucets where the disks are crossed in only one direction by water which then flows in the faucet or in the cartridge bodies, or to those faucets where water flows across the disks in each direction. However, the application to valves and faucets is not exclusive and, as mentioned above, other applications, foreseen for the pairs of seal members according to the process of this invention, are in industrial valves, particularly those subject to high temperatures and/or to the action of chemical products, and to valves and pistons for diesel engine injection pumps.

Figure 2:
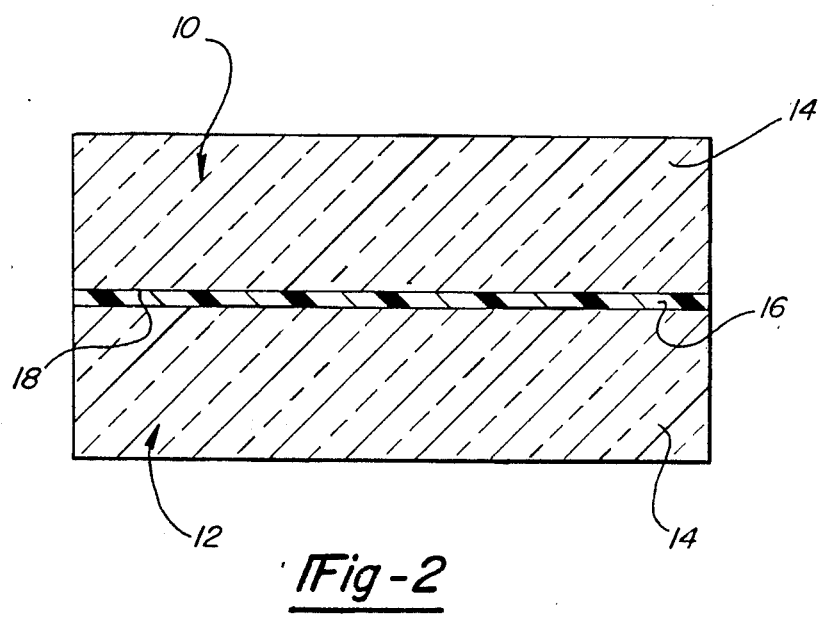
FIG. 2 is a cross-sectional perspective of an alternative embodiment of the present invention.

Referring now to FIGS. 1 and 2, the process described herein is utilized to form seal members 10 and 12 which cooperate to control fluid flow through a valve or faucet. Both seals 10 and 12 comprise a formation base 14 made of a material having a moderate hardness such as stealites, ceramic materials, metal materials or synthetic materials. At least one of the seal disks is coated with a harder material 16 which may cover the entire seal as shown in FIG. 1 or may be applied only to the working or cooperating surface 18 of one of the seals. In the preferred embodiment, the coating material is selected from the group consisting of silicium carbides, metal carbides, metal nitrides and cubic crystallographic carbons.

As a further alternative, both of the seals 10 and 12 may be completely coated with one of the coating materials. However, prior to applying the coating 16, one of the seals 10 or 12 is given a different finish such that the cooperating surfaces of the seals have different degrees of finishing.

The foregoing description has been given for clearness of understanding only and no unnecessary limitations should be understood therefrom as some modifications will be obvious to those skilled in the art without departing from the scope and spirit of the appended claims.

I claim:

1. A process for manufacturing a pair of cooperating seal members for valves and faucets and having cooperating surfaces, said process comprising:
    formation of both of said seal members from a material suitable to be ground to a precise finish;
    coating at least one of said seal members with a layer of material having a hardness coefficient greater than said formation material, said coating material being applied through a process chosen from physical vapor deposition and chemical vapor deposition; and
    finishing said cooperating surfaces of said seal members with different coefficients of friction;
    whereby said different coefficients of friction of said cooperating seal members reduces adhesion between said cooperating surfaces of said seal members facilitating relative sliding movement of one of said seal members with respect to the other of said seal members within the valve.

2. The process as defined in claim 1 wherein said formation material is selected from the group consisting of stellites, ceramic materials, metal materials and synthetic materials.

3. The process as defined in claim 1 wherein said coating material is selected from the group consisting of silicium carbides, metal carbides, metal nitrides, and cubic crystallographic lattice carbons.

4. The process as defined in claim 3 wherein said coating material is applied to only the cooperating surface of at least one of said seal members.

5. The process as defined in claim 3 wherein one of said seal members is coated with said coating material thereby providing a cooperating surface with a low coefficient of friction while said other seal member is not coated with said coating material thereby providing a cooperating surface with a high coefficient of friction.

6. The process as defined in claim 3 wherein both of said seal members are coated with said coating material and wherein the cooperating surfaces of said seal members are provided with different frictional characteristics.

7. The process as defined in claim 6 wherein said different frictional characteristics are obtained by coating said seal members with different coating materials.

8. The process as defined in claim 6 wherein said different frictional characteristics are obtained by applying said coating material onto cooperating surfaces having different degrees of finishing.

9. The process as defined in claim 1 wherein said seal members are formed into disks for valves and faucets.

* * * * *